(12) United States Patent
Wang et al.

(10) Patent No.: US 11,811,457 B2
(45) Date of Patent: Nov. 7, 2023

(54) SYSTEM AND METHOD FOR GENERATING MILLIMETER WAVE NOISE WITH FLAT RADIO FREQUENCY SPECTRUM

(71) Applicant: GUANGDONG UNIVERSITY OF TECHNOLOGY, Guangdong (CN)

(72) Inventors: Yuncai Wang, Guangdong (CN); Yimin Huang, Guangdong (CN); Yuehui Sun, Guangdong (CN); Wenjie Liu, Guangdong (CN); Zhensen Gao, Guangdong (CN); Yu Cheng, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 18/022,976

(22) PCT Filed: Jul. 21, 2021

(86) PCT No.: PCT/CN2021/107723
§ 371 (c)(1),
(2) Date: Feb. 23, 2023

(87) PCT Pub. No.: WO2022/267142
PCT Pub. Date: Dec. 29, 2022

(65) Prior Publication Data
US 2023/0261753 A1    Aug. 17, 2023

(30) Foreign Application Priority Data

Jun. 24, 2021 (CN) .......................... 202110708015.3

(51) Int. Cl.
*H04B 10/508*  (2013.01)
*H04B 10/69*  (2013.01)

(52) U.S. Cl.
CPC ......... *H04B 10/508* (2013.01); *H04B 10/697* (2013.01)

(58) Field of Classification Search
CPC ..................... H04B 10/697; H04B 10/508
(Continued)

(56) References Cited

U.S. PATENT DOCUMENTS

| 11,231,278 | B1 * | 1/2022 | Digonnet | H04B 10/503 |
| 2011/0305463 | A1 * | 12/2011 | Mohamad | H04B 10/90 |
| | | | | 398/182 |
| 2022/0221583 | A1 * | 7/2022 | Rolland | G01S 7/4917 |

FOREIGN PATENT DOCUMENTS

| CN | 103368653 | 10/2013 |
| CN | 110830120 | 2/2020 |

(Continued)

OTHER PUBLICATIONS

Sun et al; Flat Millimeter-Wave Noise Generation by Optically Mixing Multiple Wavelength-Sliced ASE Lights; Nov. 2021; IEEE; pp. 1-4. (Year: 2021).*

(Continued)

*Primary Examiner* — Amritbir K Sandhu
(74) *Attorney, Agent, or Firm* — JCIPRNET (57) ABSTRACT

A method for generating millimeter wave noise with a flat RF (radio frequency) spectrum includes the following steps. A noise optical signal with an optical spectrum in Gaussian shape is output by a first optical emission module. The noise optical signal is transmitted to an optical coupler. n beams of noise optical signals with optical spectra in Gaussian shape is output by a second optical emission module. The noise optical signals is transmitted to the optical coupler. The noise light generated by the first optical emission module and the second optical emission module is coupled to the optical coupler. The coupled optical signals is transmitted to a photodetector. The beat frequency is performed by the (Continued)

photodetector to realize mapping transformation from the optical spectra to the RF spectra. The flat millimeter wave noise is output.

4 Claims, 5 Drawing Sheets

(58) Field of Classification Search
USPC .......................................................... 398/183
See application file for complete search history.

(56) References Cited

FOREIGN PATENT DOCUMENTS

| CN | 110850129 | | 2/2020 | |
|---|---|---|---|---|
| CN | 110850129 A | * | 2/2020 | ............. G01H 17/00 |
| CN | 110098555 | | 9/2020 | |
| CN | 112217477 | | 1/2021 | |
| CN | 112217477 A | * | 1/2021 | |

OTHER PUBLICATIONS

Serdar Arslan et al., "A Broadband Microwave Noise Generator Using Zener Diodes and a New Technique for Generating White Noise", IEEE Microwave and Wireless Components Letters, Apr. 2018, pp. 329-331.

Daniel Bruch et al., "A Noise Source Module for In-Situ Noise Figure Measurements From DC to 50 GHz at Cryogenic Temperatures", IEEE Microwave and Wireless Components Letters, Dec. 2012, pp. 657-659.

Sebastian Diebold et al., "A W—Band Monolithic Integrated Active Hot and Cold Noise Source", IEEE Transactions on Microwave Theory and Techniques, Mar. 2014, pp. 623-630.

H. Ghanem et al., "Modeling and Analysis of a Broadband Schottky Diode Noise Source Up To 325 GHz Based on 55-nm SiGe BiCMOS Technology", IEEE Transactions on Microwave Theory and Techniques, Jun. 2020, pp. 2268-2277.

Ho-Jin Song et al., "Microwave Photonic Noise Source From Microwave to Sub-Terahertz Wave Bands and Its Applications to Noise Characterization", IEEE Transactions on Microwave Theory and Techniques, Dec. 2008, pp. 2989-2997.

J.-W. Shi et al., "Photonic Generation of Millimeter-Wave White-Light at W-Band Using a Very Broadband and High-Power Photonic Emitter", IEEE Photonics Technology Letters, Jun. 1, 2015, pp. 847-849.

"International Search Report (Form PCT/ISA/210) of PCT/CN2021/107723," dated Mar. 1, 2022, with English translation thereof, pp. 1-5.

* cited by examiner

SYSTEM AND METHOD FOR GENERATING MILLIMETER WAVE NOISE WITH FLAT RADIO FREQUENCY SPECTRUM

CROSS-REFERENCE TO RELATED APPLICATION

This application is a 371 of international application of PCT application serial no. PCT/CN2021/107723, filed on Jul. 21, 2021, which claims the priority benefit of China application no. 202110708015.3, filed on Jun. 24, 2021. The entirety of each of the above mentioned patent applications is hereby incorporated by reference herein and made a part of this specification.

TECHNICAL FIELD

The present invention relates to the field of signal generators, and particularly relates to a system and method for generating millimeter wave noise signal with a flat RF(radio frequency) spectrum.

BACKGROUND

A noise generator is an important device capable of testing device parameters and detecting system performance, and noise signals outputted by the noise generator feature wide frequency band, flat RF spectrum, controllable power and the like.

The core of the noise generator is a noise source. Frequently used noise sources for existing noise generators include noise generated by physical devices such as a resistor, a Schottky diode, a field-effect transistor (FET), a bipolar junction transistor (BJT), a Zener diode and an avalanche diode and so on. However, limited by the bandwidth of the electronic devices, it is hard to generate noise signals at millimeter wave band, which is the difficulty of current research.

Arslan et al. from Department of Electrical and Electronic Engineering of Murastakman University have developed a 3.2 GHz noise generator by utilizing the Zener diode (IEEE Microw. Wirel. Co. Lett, 28(4), 329-331, 2018); Bruch et al. from Fraunhofer Research Institution have developed a 50 GHz noise source by utilizing a heterojunction bipolar junction transistor (HBT) (IEEE Microw. Wirel. Co. Lett., 22(12), 657-659, 2012); Diebold et al. from Karlsruhe Institute of Technology have realized a monolithic integrated active cold noise source at W wave band (75-110 GHz) by utilizing a heterojunction high electron mobility transistor (HEMT)(IEEE T Microw. Theory Tech., 62(3), 623-630, 2014); Doctor Ghanem from Institute of Electronics, Microelectronics and Nanotechnology, University of Lille has realized a silicon Schottky diode noise source based on a 55 nm SiGe BiCMOS process, with the highest noise frequency reaching 325 GHz (IEEE T Microw. Theory Tech., 68(6), 2268-2277, 2020). However, noise power outputted by these noise sources is relatively low, and limited by the electronic bandwidth, it is hard to achieve a higher frequency band.

In 2008, Professors Ho-Jin Song et al. from Nippon Telegraph and Telephone Corporation has realized electrical noise with a flat broadband spectrum by filtering amplified spontaneous emission noise generated by an erbium-doped optical fiber amplifier to further beat frequency by utilizing a uni-traveling-carrier photodiode 4 (UTC-PD) (IEEE T Micro. Theory Tech., 56(12), 2989-2997, 2008). However, there is a problem of relatively low output power of noise generated by the amplified spontaneous emission noise. Subsequently, with reference to technique of the Professor Ho-Jin Song, Professor Xu Jinwei from Department of Electrical Engineering of a university in Taiwan generates 75-110 GHz white noise by means of frequency beating of two different light sources (IEEE Photon. Tech. Lett., 22(11), 847-849, 2010).

Chinese Invention Patent CN110098555B has disclosed "ultra wide band white noise source based on parallel multichannel and multimode chaos laser devices", with a Publication Date: Sep. 15, 2020. Compared with existing electronic noise sources, while using the parallel multimode chaos laser devices to generate ultra wide band white noise, the parallel multimode chaos laser devices is relatively simple in structure and easy to be implemented; moreover, by adopting a photon—electron conversion method, the present invention effectively avoids the bottleneck of the electronic bandwidth, so that the bandwidth of the white noise can be extremely improved; the power of the white noise generated by the present invention is dependent on power of chaos laser devices and responsivity of the photodetector 4. Therefore, the finally generated ultra wide band white noise is adjustable in power and the maximum power is higher. However, the noise generated by the method also has the defect of non-flat RF spectrum. In addition, the method needs more laser devices, so that the structure is complex.

SUMMARY

To solve the technical defect that the current millimeter wave noise generator features non-flat RF spectrum and insufficient bandwidth, the present invention provides a system and method for generating millimeter wave noise with a flat RF spectrum.

In order to achieve the above objective, the present invention adopts a technical solution as follows:

A system for generating millimeter wave noise with a flat RF spectrum, including a first optical emission module, a second optical emission module, an optical coupler and a photodetector, wherein noise optical signals outputted by the first optical emission module and the second optical emission module are transmitted to an input end of the optical coupler, the optical coupler couples the noise optical signals and outputs the noise optical signals to an input end of the photodetector, and beat frequency is performed by the photodetector to realize mapping transformation from the optical spectrum to the RF spectrum, so as to output the flat millimeter wave noise.

In the above solution, by using the optical noise signals as a noise source, compared with an electronic noise source such as a diode, the noise with the flat RF spectrum can be generated at the millimeter wave band. Compared with spontaneous radiation noise of an erbium-doped optical fiber amplifier, in the present invention, a plurality of beams of noise light sources with Gaussian optical spectra are used for performing beat frequency to generate the broadband millimeter wave noise. The generated optical noise signal is higher in amplitude and more flat in RF spectrum.

Preferably, the first optical emission module outputs the noise optical signal with a central wavelength of $\lambda_0$, a linewidth of B and an optical spectrum in Gaussian shape; and the second optical emission module outputs n beams of noise optical signals with central wavelengths of $\lambda_1, \lambda_2, \ldots \lambda_n$ ($n \geq 2$), linewidths of B and optical spectra in Gaussian shape.

Preferably, the first optical emission module includes a first Amplified Spontaneous Emission (ASE) light source and a first optical filter, an output end of the first ASE light source is electrically connected to an input end of the first optical filter, and an output end of the first optical filter is electrically connected to an input end of the optical coupler.

Preferably, the second optical emission module includes a second ASE light source and an optical splitting processor, an output end of the second ASE light source is electrically connected to an input end of the optical splitting processor, and an output end of the optical splitting processor is electrically connected to the input end of the optical coupler.

Preferably, the optical splitting processor includes an optical splitter, a plurality of second optical filters and an optical splitting coupler; the second ASE light source is electrically connected to an input end of the optical splitter, an output end of the optical splitter is electrically connected to input ends of the plurality of second optical filters, output ends of the plurality of second optical filters are electrically connected to an input end of the optical splitting coupler, and an output end of the optical splitting coupler is electrically connected to the input end of the optical coupler.

Preferably, the optical splitting processor includes an arrayed waveguide grating and a dense wavelength division multiplexing module, the second ASE light source is electrically connected to an input end of the arrayed waveguide grating, an output end of the arrayed waveguide grating is electrically connected to an input end of the dense wavelength division multiplexing module, and an output end of the dense wavelength division multiplexing module is electrically connected to the input end of the optical coupler.

A method for generating millimeter wave noise with a flat RF spectrum, applied to the system for generating millimeter wave noise with the flat RF spectrum, including the following steps:

S1: outputting, by a first optical emission module, a noise optical signal with an optical spectrum in Gaussian shape, and transmitting the noise optical signal to an optical coupler 3;

S2: outputting, by a second optical emission module, n beams of noise optical signals with optical spectra in Gaussian shape, and transmitting the noise optical signals to the optical coupler 3;

S3: coupling noise light generated by the first optical emission module and the second optical emission module to the optical coupler, and transmitting the coupled optical signals to a photodetector; and S4: performing beat frequency, by the photodetector, to realize mapping transformation from the optical spectra to the RF spectra, and outputting the flat millimeter wave noise.

Preferably, in step S2, when the second optical emission module outputs two beams of noise light, the central wavelengths of the two beams of light are respectively A1 and A2 and the linewidths are B, and flat millimeter wave noise covering a to b GHz is generated, wherein a and b are respectively equal to $c/(\lambda_1-\lambda_0)$ and $c/(\lambda_2-\lambda_0)$, c is the velocity of light, and flatness m of the generated millimeter wave noise satisfies the following equation:

$$m = -10\log\left(\frac{2e^{-\ln2\frac{(a-b)^2}{2B^2}} + 6e^{-\ln2\frac{(a+b)^2}{2B^2}} + e^{-\ln2\frac{(3a-b)^2}{2B^2}}}{1 + e^{-2\ln2\frac{(a-b)^2}{B^2}} + 6e^{-2\ln2\frac{a^2}{B^2}} + e^{-2\ln2\frac{(2a-b)^2}{B^2}}}\right).$$

Preferably, in step S2, when the second optical emission module outputs n beams of noise light, and assuming that the central wavelengths of the n beams of light are respectively $\lambda_1, \lambda_2, \ldots, \lambda_n$ (n≥3), flat millimeter wave noise covering a to b GHz is generated, wherein a and b are respectively equal to $c/(\lambda_1-\lambda_0)$ and $c/(\lambda_n-\lambda_0)$ c is the velocity of light, and flatness m of the generated millimeter wave noise satisfies the following equations:

$$m = -10\log\left(\frac{\sum_{k=0}^{n-1} e^{-\frac{|2i-1|}{2}\ln2\left[\frac{a-b}{B(n-1)}\right]^2} + \delta_P}{1 + e^{-2\ln2\left[\frac{a-b}{B(n-1)}\right]^2} + \sum_{k=1}^{n-2} e^{-2i^2\ln2\left[\frac{a-b}{B(n-1)}\right]^2} + \delta_M}\right)$$

$$\delta_P = n(n+1)e^{-\frac{\ln2}{2}\left[\frac{(2n-3)a+b}{B(n-1)}\right]^2} + \sum_{i=1}^{n-1} i \cdot e^{-\frac{\ln2}{2}\left[\frac{(4n-2i-3)a+(1-2n-2i)b}{B(n-1)}\right]^2}$$

$$\delta_M = n(n+1)e^{-2\ln2\left[\frac{(n-2)a+b}{B(n-1)}\right]^2} + \sum_{i=1}^{n-1} i \cdot e^{-2\ln2\left[\frac{(2n-i-2)a-(1+n-i)b}{B(n-1)}\right]^2}.$$

Preferably, in step S4, the noise light outputted by the second optical emission module is noise light with Gaussian spectrum shapes.

Compared with the prior art, the present disclosure has the following beneficial effects:

The present invention provides a system and method for generating millimeter wave noise with a flat RF spectrum. By using the optical noise signals as a noise source, compared with an electronic noise source such as a diode, the noise with the flat RF spectrum can be generated at the millimeter wave band. Compared with spontaneous radiation noise of an erbium-doped optical fiber amplifier, in the present invention, a plurality of beams of noise light sources with Gaussian optical spectra are used for performing beat frequency to generate the broadband millimeter wave noise. The generated optical noise signal is higher in amplitude and more flat in RF spectrum.

Description of numerals in drawings: 1-first optical emission module; 2-second optical emission module; 3-optical coupler; 4-photodetector; 11-first ASE light source; 12-first optical filter; 21-second ASE light source; 221-optical splitter; 222-second optical filter; 223-optical splitting coupler; 224-arrayed waveguide grating; 225-dense wavelength division multiplexing module.

DETAILED DESCRIPTION OF EMBODIMENTS

The drawings are merely used for exemplary description and are not construed as limitation to the patent.

The present invention will be further described below in combination with drawings and embodiments.

Embodiment 1

Figure 1:
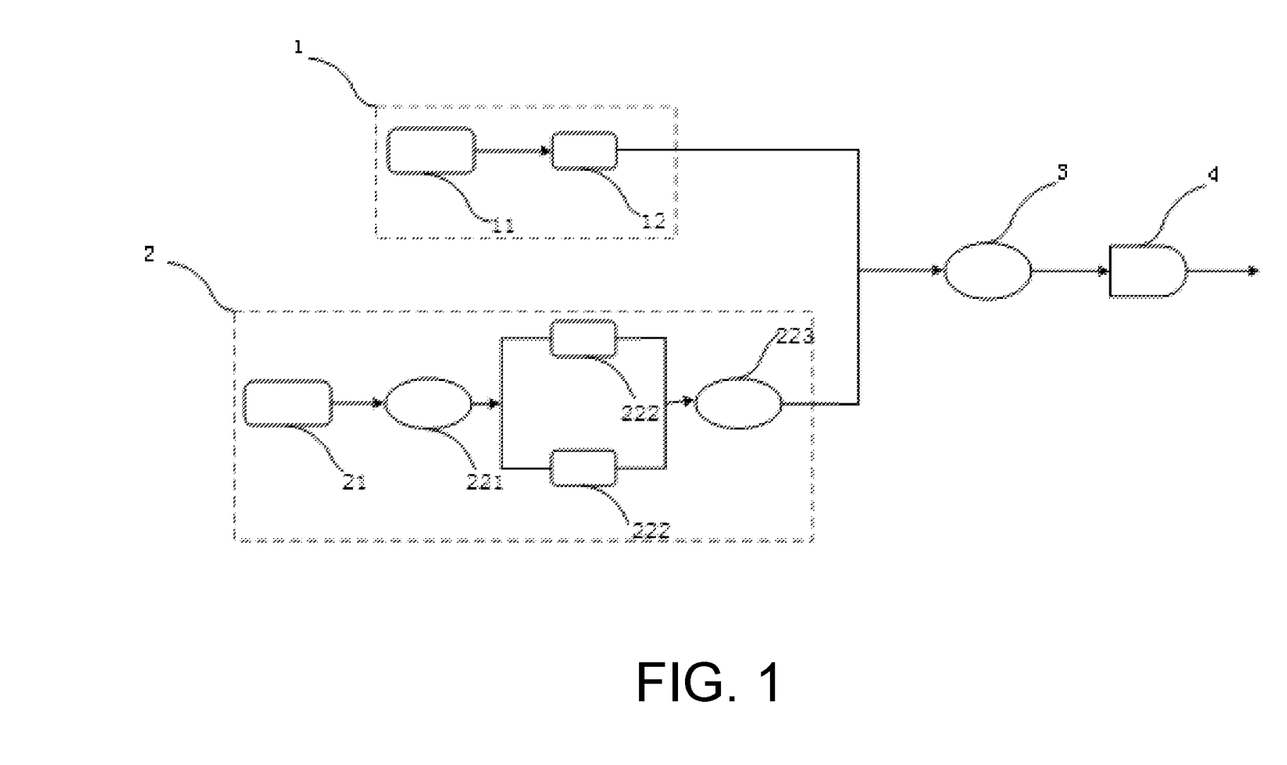
FIG. 1 is a schematic systematic diagram of an optical splitting processor including an optical splitter, second optical filters and an optical coupler provided by the present invention.

As shown in FIG. 1, a system for generating millimeter wave noise with a flat RF spectrum includes a first optical emission module 1, a second optical emission module 2, an optical coupler 3 and a photodetector 4, wherein noise optical signals outputted by the first optical emission module 1 and the second optical emission module 2 are transmitted to an input end of the optical coupler 3, the optical coupler 3 couples the noise optical signals and outputs the noise optical signals to an input end of the photodetector 4, and beat frequency is performed by the photodetector 4 to realize mapping transformation from the optical spectrum to the RF spectrum, so as to output the flat millimeter wave noise.

In the above solution, by using the optical noise signals as a noise source, compared with an electronic noise source such as a diode, the noise with the flat RF spectrum can be generated at the millimeter wave band. Compared with spontaneous radiation noise of an erbium-doped optical fiber amplifier, in the present invention, a plurality of beams of noise light sources with Gaussian optical spectra are used for performing to generate the broadband millimeter wave noise. The generated optical noise signal is higher in amplitude and more flat in RF spectrum.

Preferably, the first optical emission module 1 outputs the noise optical signal with a central wavelength of $\lambda_0$, a linewidth of B and an optical spectrum in Gaussian shape; and the second optical emission module 2 outputs n beams of noise optical signals with central wavelengths of $\lambda_1$, $\lambda_2$, $\lambda_n$ (n≥2), linewidths of B and optical spectra in Gaussian shape.

Preferably, the first optical emission module 1 includes a first Amplified Spontaneous Emission (ASE) light source 11 and a first optical filter 12, an output end of the first ASE light source 11 is electrically connected to an input end of the first optical filter 12, and an output end of the first optical filter 12 is electrically connected to an input end of the optical coupler 3.

Preferably, the second optical emission module 2 includes a second ASE light source 21 and an optical splitting processor, an output end of the second ASE light source 21 is electrically connected to an input end of the optical splitting processor, and an output end of the optical splitting processor is electrically connected to the input end of the optical coupler 3.

Preferably, the optical splitting processor includes an optical splitter 221, second optical filters 222 and an optical splitting coupler 223; and there are two second optical filters 222, the second ASE light source 21 is electrically connected to an input end of the optical splitter 221, an output end of the optical splitter 221 is electrically connected to input ends of the two second optical filters 222, output ends of the two second optical filters 222 are electrically connected to an input end of the optical splitting coupler 223, and an output end of the optical splitting coupler 223 is electrically connected to the input end of the optical coupler 3.

Embodiment 2

Figure 2:
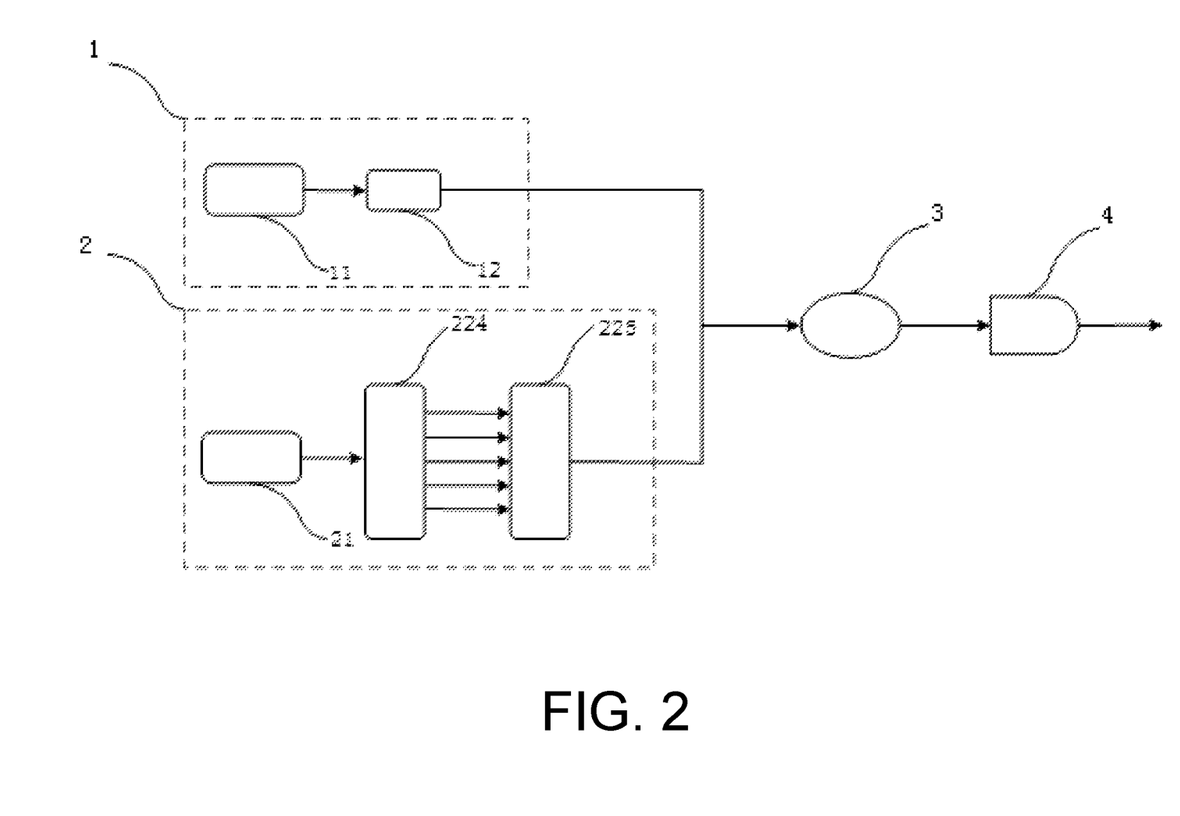
FIG. 2 is a schematic systematic diagram of the optical splitting processor including an arrayed waveguide grating and a dense wavelength division multiplexing module provided by the present invention.

As shown in FIG. 2, a system for generating millimeter wave noise with a flat RF spectrum includes a first optical emission module 1, a second optical emission module 2, an optical coupler 3 and a photodetector 4, wherein noise optical signals outputted by the first optical emission module 1 and the second optical emission module 2 are transmitted to an input end of the optical coupler 3, the optical coupler 3 couples the noise optical signals and outputs the noise optical signals to an input end of the photodetector 4, and beat frequency is performed by the photodetector 4 to realize mapping transformation from the optical spectrum to the RF spectrum, so as to output the flat millimeter wave noise.

In the above solution, by using the optical noise signals as a noise source, compared with an electronic noise source such as a diode, the noise with the flat RF spectrum can be generated at the millimeter wave band. Compared with spontaneous radiation noise of an erbium-doped optical fiber amplifier, in the present invention, a plurality of beams of noise light sources with Gaussian optical spectra are used for performing beat frequency to generate the broadband millimeter wave noise. The generated optical noise signal is higher in amplitude and more flat in RF spectrum.

Preferably, the first optical emission module 1 outputs the noise optical signal with a central wavelength of $\lambda_0$, a linewidth of B and an optical spectrum in Gaussian shape; and the second optical emission module 2 outputs n beams of noise optical signals with central wavelengths of $\lambda_1$, $\lambda_2$, ... $\lambda_n$ (n≥2), linewidths of B and optical spectra in Gaussian shape.

Preferably, the first optical emission module 1 includes a first Amplified Spontaneous Emission (ASE) light source 11 and a first optical filter 12, an output end of the first ASE light source 11 is electrically connected to an input end of the first optical filter 12, and an output end of the first optical filter 12 is electrically connected to an input end of the optical coupler 3.

Preferably, the second optical emission module 2 includes a second ASE light source 21 and an optical splitting processor, an output end of the second ASE light source 21 is electrically connected to an input end of the optical splitting processor, and an output end of the optical splitting processor is electrically connected to the input end of the optical coupler 3.

Preferably, the optical splitting processor includes an arrayed waveguide grating 224 and a dense wavelength division multiplexing module 225, the second ASE light source 21 is electrically connected to an input end of the arrayed waveguide grating 224, an output end of the arrayed waveguide grating 224 is electrically connected to an input end of the dense wavelength division multiplexing module 225, and an output end of the dense wavelength division multiplexing module 225 is electrically connected to the input end of the optical coupler 3.

Embodiment 3

Figure 3:
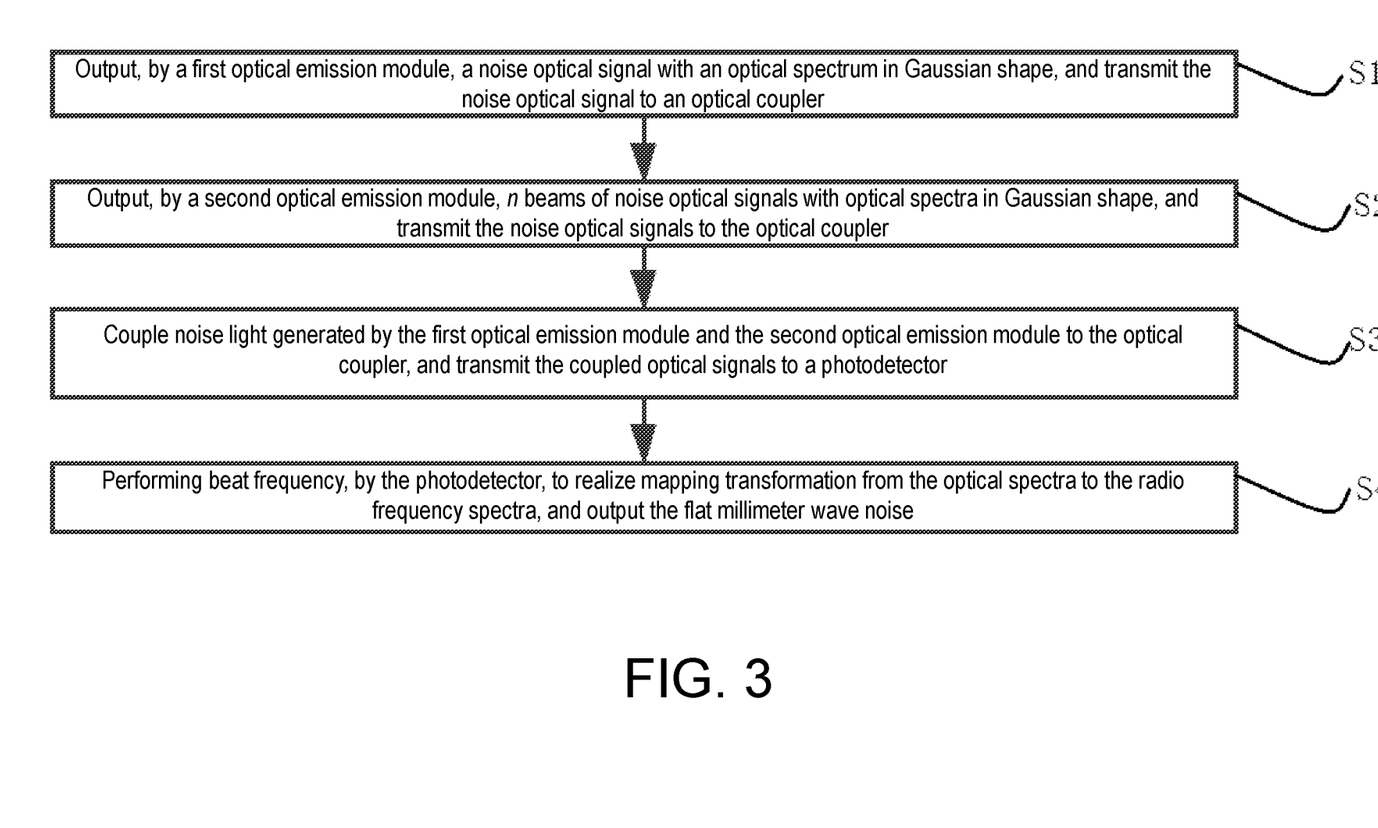
FIG. 3 is a flow diagram of a method of the present invention.
Figure 4:
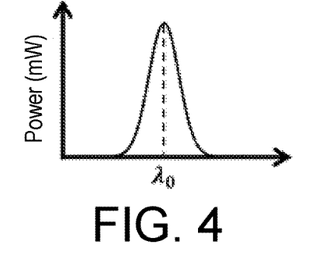
FIG. 4 is a spectrogram of light outputted by a first optical emission module.
Figure 5:
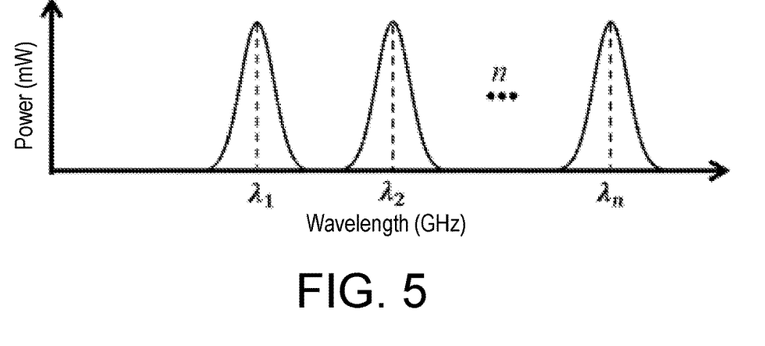
FIG. 5 is a spectrogram of light outputted by a second optical emission module.
Figure 6:
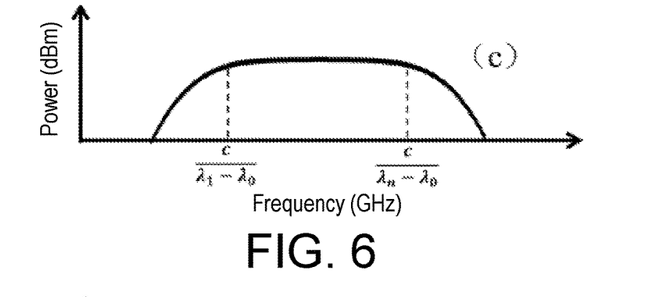
FIG. 6 is a diagram of flat millimeter wave noise outputted by a photodetector provided by the present invention.

As shown in FIG. 3, FIG. 4, FIG. 5 and FIG. 6, a system for generating millimeter wave noise with a flat RF spectrum, applied to the system for generating millimeter wave noise with the flat RF spectrum, including the following steps:

S1: a noise optical signal with a center wavelength of $\lambda_0$, a linewidth of B and an optical spectrum being in Gaussian shape is outputted by a first optical emission module 1, and the noise optical signal is transmitted to an optical coupler 3;

S2: n beams of noise optical signals with center wavelengths of $\lambda_1, \lambda_2, \ldots, \lambda_n$ (n≥2), the linewidths of B and the optical spectra being in Gaussian shape are outputted by a second optical emission module 2, and the noise optical signals are transmitted to the optical coupler 3;

S3: noise light generated by the first optical emission module 1 and the second optical emission module 2 is coupled to the optical coupler 3, and the coupled optical signals are transmitted to a photodetector 4; and S4: beat frequency is performed by the photodetector 4 to realize mapping transformation from the optical spectra to the RF spectra, and the flat millimeter wave noise is outputted.

Preferably, in step S2, when the second optical emission module 2 outputs two beams of noise light, the central wavelengths of the two beams of light are respectively $\lambda_1$ and $\lambda_2$ and the linewidths are B, and flat millimeter wave noise covering a to b GHz is generated, wherein a and b are respectively equal to $c/(\lambda_1-\lambda_0)$ and $c/(\lambda_2-\lambda_0)$, c is the velocity of light, and flatness m of the generated millimeter wave noise satisfies the following equation:

$$m = -10\log\left(\frac{2e^{-\ln2\frac{(a-b)^2}{2B^2}} + 6e^{-\ln2\frac{(a+b)^2}{2B^2}} + e^{-\ln2\frac{(3a-b)^2}{2B^2}}}{1 + e^{-2\ln2\frac{(a-b)^2}{B^2}} + 6e^{-2\ln2\frac{a^2}{B^2}} + e^{-2\ln2\frac{(2a-b)^2}{B^2}}}\right).$$

Preferably, in step S2, when the second optical emission module 2 outputs n beams of noise light, and assuming that the central wavelengths of the n beams of light are respectively $\lambda_1, \lambda_2, \ldots, \lambda_n$ (n≥3), flat millimeter wave noise covering a to b GHz is generated, wherein a and b are respectively equal to $c/(\lambda_1-\lambda_0)$ and $c/(\lambda_n-\lambda_0)$ c is the velocity of light, and flatness m of the generated millimeter wave noise satisfies the following equations:

$$m = -10\log\left(\frac{\sum_{k=0}^{n-1} e^{-\frac{|2i-1|}{2}\ln2\left[\frac{a-b}{B(n-1)}\right]^2} + \delta_P}{1 + e^{-2\ln2\left[\frac{a-b}{B(n-1)}\right]^2} + \sum_{k=1}^{n-2} e^{-2i^2\ln2\left[\frac{a-b}{B(n-1)}\right]^2} + \delta_M}\right)$$

$$\delta_P = n(n+1)e^{-\frac{\ln2}{2}\left[\frac{(2n-3)a+b}{B(n-1)}\right]^2} + \sum_{i=1}^{n-1} i \cdot e^{-\frac{\ln2}{2}\left[\frac{(4n-2i-3)a+(1-2n-2i)b}{B(n-1)}\right]^2}$$

$$\delta_M = n(n+1)e^{-2\ln2\left[\frac{(n-2)a+b}{B(n-1)}\right]^2} + \sum_{i=1}^{n-1} i \cdot e^{-2\ln2\left[\frac{(2n-i-2)a-(1+n-i)b}{B(n-1)}\right]^2}.$$

Preferably, in step S4, the noise light outputted by the second optical emission module 2 is noise light with Gaussian spectrum shapes.

Embodiment 4

Figure 7:
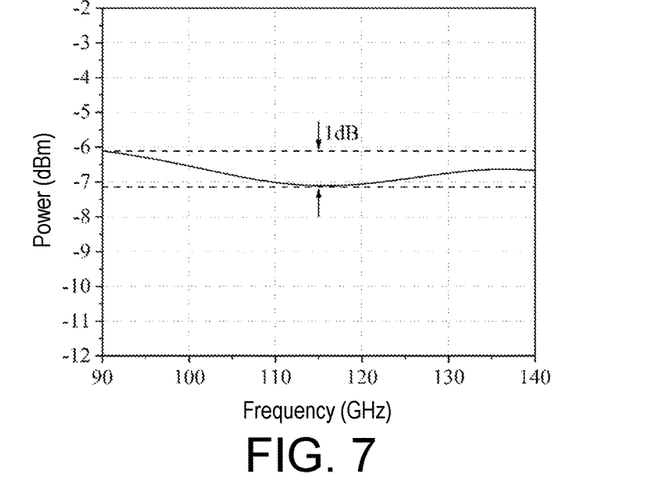
FIG. 7 is an imitated systematic numerical value diagram of the optical splitting processor including the optical splitter, the second optical filters and the optical coupler provided by the present invention.

As shown in FIG. 7, the first optical emission module 1 outputs a noise optical signal with a center wavelength of $\lambda_0$, a linewidth of B and the optical spectrum being in Gaussian shape, and the second optical emission module 2 outputs the noise optical signals with center wavelengths of $\lambda_1$ and $\lambda_2$, the linewidths of B and the optical spectra being in Gaussian shape. The first optical emission module 1 includes a first ASE light source 11 and a first optical filter 12, and the second optical emission module 2 includes a second ASE light source 21, an optical splitter 221, second optical filters 222 and an optical coupler 3.

The first ASE light source 11 and the second ASE light source 21 are ASE broad spectrum incoherent light sources, there are two second optical filters 222, the center wavelength of the first optical filter 12 is 1550 nm, the center wavelengths of the two second optical filters 222 are 1550.72 nm and 1551.12 nm respectively, and the millimeter wave noise with the frequency range of 90-140 GHz and the flatness of the RF spectrum of 1 dB is generated. At the time, the flatness m and the spectral linewidth B of the generated millimeter wave noise satisfy the following equation:

$$m = -10\log\left(\frac{2e^{-\ln2\frac{(a-b)^2}{2B^2}} + 6e^{-\ln2\frac{(a+b)^2}{2B^2}} + e^{-\ln2\frac{(3a-b)^2}{2B^2}}}{1 + e^{-2\ln2\frac{(a-b)^2}{B^2}} + 6e^{-2\ln2\frac{a^2}{B^2}} + e^{-2\ln2\frac{(2a-b)^2}{B^2}}}\right),$$

where a and b are start frequency and cutoff frequency of the millimeter wave noise spectrum, i.e., a=90 and b=140. It can be solved from the above equation that the spectral linewidth B shall be 0.2718 nm, i.e., the spectral linewidths B of the first optical filter 12 and the second optical filters 222 are 0.2718 nm.

The first ASE light source 11 generates a Gaussian spectrum with the center wavelength of 1550 nm and the linewidth of 0.2718 nm through the first optical filter 12. The second ASE light source 21 splits the optical signal into two parts of optical signal: one part of optical signal passes through one second optical filter 222 to generate the Gaussian spectrum with the center wavelength of 1550.72 nm and the linewidth of 0.2718 nm, and the other part of optical signal passes through another second optical filter 222 to generate the Gaussian spectrum with the center wavelength of 1551.12 nm and the linewidth of 0.2718 nm, and the optical signals passing through the two second optical filters 222 are coupled to the optical coupler 3. Finally, the optical noise signals emitted by the first optical emission module 1 and the second optical emission module 2 are coupled to the optical coupler 3. The coupled optical signals are outputted from the output end of the optical coupler 3 and are inputted to the input end of the photodetector 4. Beat frequency is performed on the photodetector 4 to realize mapping transformation from optical spectrum to RF spectrum. Finally, the millimeter wave electric noise with the RF spectrum flatness of 1 dB within the range of 90-140 GHz is outputted, and the numerical simulation result of MATLAB is shown in FIG. 7.

Embodiment 5

Figure 8:
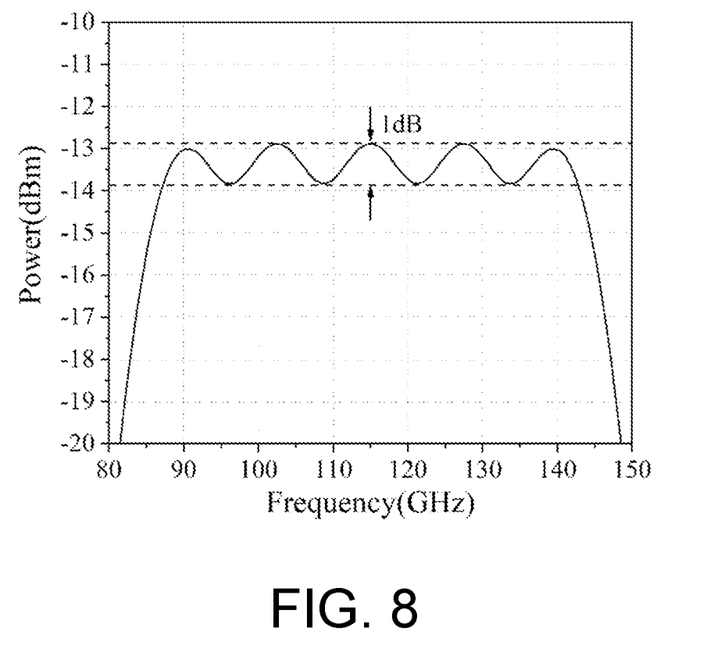
FIG. 8 is an imitated systematic numerical value diagram of the optical splitting processor including the arrayed waveguide grating and the dense wavelength division multiplexing module provided by the present invention.

As shown in FIG. 8, the first optical emission module 1 outputs a noise optical signal with a center wavelength of $\lambda_0$, a linewidth of B and the optical spectrum being in Gaussian shape, and the second optical emission module 2 outputs five noise optical signals with center wavelengths of $\lambda_4, \lambda_2, \lambda_3$, $\lambda_4$ and $\lambda_5$, the linewidths of B and the optical spectra being in Gaussian shape. The first optical emission module 1 includes a first ASE light source 11 and a first optical filter 12, and the second emission module 2 includes a second ASE light source 21, an arrayed waveguide grating 224 and a dense wavelength division multiplexing module 225.

The first ASE light source 11 and the second ASE light source 21 are ASE broad spectrum incoherent light sources, and the center wavelength of the first optical filter 12 is 1550 nm, i.e., $\lambda_0=1550$ nm and the filter linewidth is B. The first ASE light source 11 passes through the first optical filter 12 and enters the input end of the optical coupler 3. The center wavelength of the arrayed waveguide grating 224 is 1550.72 nm, the wavelength interval is 0.1 nm, the channel bandwidth is B and the filter shape is Gaussian. Channels with wavelengths being 1550.72 nm, 1550.82 nm, 1550.92 nm, 1551.02 nm and 1551.12 nm are selected, wherein $\lambda_1=1550.72$ nm, $\lambda_2=1550.82$ nm, $\lambda_3=1550.92$ nm, $\lambda_4=1551.02$ nm and $\lambda_5=1551.12$ nm. In the embodiment, the millimeter wave noise with the frequency range of 90-140 GHz is generated, with the flatness of the RF spectrum of 1 dB. At the time, the flatness m and the spectral linewidth B of the generated millimeter wave noise satisfy the following equation:

$$m = -10\log\left(\frac{\sum_{i=0}^{n-1} e^{-\frac{|2i-1|}{2}\ln 2\left[\frac{a-b}{B(n-1)}\right]^2} + \delta_P}{1 + e^{-2\ln 2\left[\frac{a-b}{B(n-1)}\right]^2} + \sum_{i=1}^{n-2} e^{-2i^2\ln 2\left[\frac{a-b}{B(n-1)}\right]^2} + \delta_M}\right),$$

where $$\delta_P = n(n+1)e^{-\frac{\ln 2}{2}\left[\frac{(2n-3)a+b}{B(n-1)}\right]^2} + \sum_{i=1}^{n-1} i \cdot e^{-\frac{\ln 2}{2}\left[\frac{(4n-2i-3)a+(1-2n-2i)b}{B(n-1)}\right]^2}$$

$$\delta_M = n(n+1)e^{-2\ln 2\left[\frac{(n-2)a+b}{B(n-1)}\right]^2} + \sum_{i=1}^{n-1} i \cdot e^{-2\ln 2\left[\frac{(2n-i-2)a-(1+n-i)b}{B(n-1)}\right]^2},$$

where a and b are start frequency and cutoff frequency of the noise spectrum, i.e., a=90, b=140 and n=5. It can be solved from the above equation that the channel linewidth B of the arrayed waveguide grating 224 shall be 0.065 nm.

The optical noise signals generated by the arrayed waveguide grating 224 are coupled by the dense wavelength division multiplexing module 225, the coupled optical signal is outputted from the output end of the dense wavelength division multiplexing module 225 and is inputted to the input end of the optical coupler 3, after the first optical emission module 1 and the second optical emission module 2 are coupled to the optical coupler 3, the coupled optical signals are inputted to the input end of the photodetector 4. Beat frequency is performed on the photodetector 4 to realize mapping transformation from optical spectrum to RF spectrum. Finally, the millimeter wave electric noise with the RF spectrum flatness of 1 dB within the range of 90-140 GHz is outputted, and the numerical simulation result of MATLAB is shown in FIG. 8.

Apparently, the embodiments of the present invention are merely examples made for describing the present invention clearly and are not to limit the embodiments of the present invention. For those of ordinary skill in the pertained field, modifications or variations in other forms may make on the basis of the above description. There are no need and no way to exhaust all the implementations. Any modification, equivalent replacement, improvement, etc. made within the spirit and principle of the present invention shall be regarded as within the protection scope of the claims of the present invention.

What is claimed is:

1. A method for generating millimeter wave noise with a flat radio frequency spectrum, applied to a system for generating millimeter wave noise with the flat radio frequency spectrum, wherein the system for generating millimeter wave noise with the flat radio frequency spectrum comprises a first optical emission module, a second optical emission module, an optical coupler and a photodetector, wherein noise optical signals outputted by the first optical emission module and the second optical emission module are transmitted to an input end of the optical coupler, the optical coupler couples the noise optical signals and outputs the noise optical signals to an input end of the photodetector, and beat frequency is performed by the photodetector to realize mapping transformation from optical spectrum to the radio frequency spectrum, to output the flat millimeter wave noise, wherein the method for generating millimeter wave noise with the flat radio frequency spectrum comprising following steps:

S1: outputting, by the first optical emission module, the noise optical signal with an optical spectrum in Gaussian shape, and transmitting the noise optical signal to an optical coupler;

S2: outputting, by the second optical emission module, the n beams of noise optical signals with the optical spectra in Gaussian shape, and transmitting the noise optical signals to the optical coupler;

S3: coupling noise light generated by the first optical emission module and the second optical emission module to the optical coupler, and transmitting the coupled optical signals to the photodetector; and S4: performing beat frequency, by the photodetector, to realize mapping transformation from the optical spectra to the radio frequency spectra, and outputting the flat millimeter wave noise, wherein in the step S2, when the second optical emission module outputs two beams of noise light, the central wavelengths of the two beams of light are respectively $\lambda_1$ and $\lambda_2$ and the linewidths of the two beams of light are B, and the flat millimeter wave noise covering a to b GHz is generated, wherein a and b are respectively equal to $c/(\lambda_1-\lambda_0)$ and $c/(\lambda_2-\lambda_0)$, c is the velocity of light, and flatness m of the generated millimeter wave noise satisfies following equation:

$$m = -10\log\left(\frac{2e^{-\ln 2\frac{(a-b)^2}{2B^2}} + 6e^{-\ln 2\frac{(a+b)^2}{2B^2}} + e^{-\ln 2\frac{(3a-b)^2}{2B^2}}}{1 + e^{-2\ln 2\frac{(a-b)^2}{B^2}} + 6e^{-2\ln 2\frac{a^2}{B^2}} + e^{-2\ln 2\frac{(2a-b)^2}{B^2}}}\right).$$

2. A method for generating millimeter wave noise with the flat radio frequency spectrum, applied to a system for generating millimeter wave noise with the flat radio frequency spectrum, wherein the system for generating millimeter wave noise with flat radio frequency spectrum comprises a first optical emission module, a second optical emission module, an optical coupler and a photodetector, wherein noise optical signals outputted by the first optical emission module and the second optical emission module are transmitted to an input end of the optical coupler, the optical coupler couples the noise optical signals and outputs the noise optical signals to an input end of the photodetector, and beat frequency is performed by the photodetector to realize mapping transformation from optical spectrum to the radio frequency spectrum, so as to output the flat millimeter wave noise, wherein the method for generating millimeter wave noise with the flat radio frequency spectrum comprising following steps:

S1: outputting, by the first optical emission module, the noise optical signal with an optical spectrum in Gaussian shape, and transmitting the noise optical signal to an optical coupler;

S2: outputting, by the second optical emission module, the n beams of noise optical signals with the optical spectra in Gaussian shape, and transmitting the noise optical signals to the optical coupler;

S3: coupling noise light generated by the first optical emission module and the second optical emission module to the optical coupler, and transmitting the coupled optical signals to the photodetector; and S4: performing beat frequency, by the photodetector, to realize mapping transformation from the optical spectra to the radio frequency spectra, and outputting the flat millimeter wave noise, wherein in the step S2, when the second optical emission module outputs then beams of noise light, and assuming that the central wavelengths of the n beams of light are respectively $\lambda_1, \lambda_2, \ldots, \lambda_n$ (n≥13), flat millimeter wave noise covering a to b GHz is generated, wherein a and b are respectively equal to $c/(\lambda_1-\lambda_0)$ and $c/(\lambda_n-\lambda_0)$, c is the velocity of light, and flatness m of the generated millimeter wave noise satisfies following equations:

$$m = -10\log\left(\frac{\sum_{k=0}^{n-1} e^{-\frac{|2i-1|}{2}\ln2\left[\frac{a-b}{B(n-1)}\right]^2} + \delta_P}{1 + e^{-2\ln2\left[\frac{a-b}{B(n-1)}\right]^2} + \sum_{i=1}^{n-2} e^{-2i^2\ln2\left[\frac{a-b}{B(n-1)}\right]^2} + \delta_M}\right)$$

$$\delta_P = n(n+1)e^{-\frac{\ln2}{2}\left[\frac{(2n-3)a+b}{B(n-1)}\right]^2} + \sum_{i=1}^{n-1} i \cdot e^{-\frac{\ln2}{2}\left[\frac{(4n-2i-3)a+(1-2n-2i)b}{B(n-1)}\right]^2}$$

$$\delta_M = n(n+1)e^{-2\ln2\left[\frac{(n-2)a+b}{B(n-1)}\right]^2} + \sum_{i=1}^{n-1} i \cdot e^{-2\ln2\left[\frac{(2n-i-2)a-(1+n-i)b}{B(n-1)}\right]^2}.$$

3. The method for generating millimeter wave noise with the flat radio frequency spectrum according to claim 1 wherein in the step S4, the noise light outputted by the first optical emission module and the second optical emission module is noise light with Gaussian spectrum shapes.

4. The method for generating millimeter wave noise with the flat radio frequency spectrum according to claim 2, wherein in the step S4, the noise light outputted by the first optical emission module and the second optical emission module is noise light with Gaussian spectrum shapes.

* * * * *